(12) United States Patent
Lee et al.

(10) Patent No.: US 7,562,129 B1
(45) Date of Patent: Jul. 14, 2009

(54) SUBSCRIPTION MANAGEMENT SYSTEM FOR DATA COMMUNICATION NETWORK

(75) Inventors: Ronald Chi Hong Lee, Vancouver (CA); Theodore Warren Bernelot Moens, Delta (CA); Maury Richard Sponchia, Delta (CA)

(73) Assignee: Alcatel-Lucent Canada Inc., Ottawa (CA)

( * ) Notice: Subject to any disclaimer, the term of this patent is extended or adjusted under 35 U.S.C. 154(b) by 0 days.

(21) Appl. No.: 09/292,365

(22) Filed: Apr. 15, 1999

(51) Int. Cl.
*G06F 15/173* (2006.01)
*G06F 12/00* (2006.01)
(52) U.S. Cl. ..................... 709/223; 709/219
(58) Field of Classification Search ............... 709/229, 709/217, 223–226, 219, 220
See application file for complete search history.

(56) References Cited

U.S. PATENT DOCUMENTS 5,740,075 A * 4/1998 Bigham et al. ............. 709/229
6,377,982 B1 * 4/2002 Rai et al. ................... 709/217
6,986,157 B1 * 1/2006 Fijolek et al. .............. 725/111

* cited by examiner

*Primary Examiner*—Zarni Maung
(74) *Attorney, Agent, or Firm*—Oyen, Wiggs, Green & Mutala LLP

(57) ABSTRACT

A network management system allows operators to set up subscriptions to services for network users. The subscriptions each associate a subscriber object and an application object. The subscriber object contains information about the subscriber's network connection. The application object contains information about the application's network connection. The operator does not need to work with low level information such as physical port numbers to create a subscription. The system automatically sets up one or more virtual channel connections as needed to provide the application to the subscriber. The system can be easier to operate accurately than current systems. The system may track and accumulate statistics on a service-by-service basis. The statistics may be used to bill for individual services even if several different virtual channel connections are used to provide each service.

18 Claims, 9 Drawing Sheets

SUBSCRIPTION MANAGEMENT SYSTEM FOR DATA COMMUNICATION NETWORK

TECHNICAL FIELD

This invention relates to the management of data communication networks. In particular the invention relates to systems and methods for facilitating the creation and maintenance of connections between subscribers and services provided by way of a data communication network.

BACKGROUND

There is a need for systems which can be used to provide services to users connected to data communication networks. Services may include things such as video-on-demand, audio-on-demand, on-line games and amusements, or Internet access, which are provided by a service provider, to subscribers who are connected to a data communications network.

The currently accepted approach to setting up the network connections needed to provide such services is tedious, requires technically skilled personnel and is susceptible to errors. First, the physical port to which the subscriber is attached to the network must be identified. Next, the service's connection requirements, including bandwidth, must be studied to determine what sort of connection is needed. Appropriate connections from one or more of the service provider's servers to the subscriber's physical port can then be established. The connections must be monitored for billing purposes and billing information must be accumulated and associated with the subscriber.

Existing network management tools such as the MainStreetXpress™ 46020™ network manager available from Newbridge Networks Corporation of Kanata, Ontario, Canada provide for the centralized management of network connections but operate at a low level. Such management tools allow an operator to configure network nodes, cards and modules and manage links and paths throughout a network from a single location. The operator must still, however, have reasonably advanced technical knowledge of the network and must manipulate physical port addresses and other similarly low level information to set up a service for a subscriber.

Another problem with existing network management tools is that they track network statistics in a manner which provides the information necessary to make "wholesale" sales of network bandwidth but do not provide sufficient information to conveniently bill on a selective basis for particular services provided over the network. The inability of existing network management systems to collect the information necessary to bill for individual services has provided an obstacle to the deployment of such services by network providers.

SUMMARY OF THE INVENTION

This invention provides a management system for a data communication network. The management system allows for the creation of subscriptions which each relate a subscriber to a service. The management system can create communication channels needed to provide the subscription to the subscriber automatically. It is not necessary for a human operator of the management system to provide low level information about the network each time a subscription is created.

In one aspect of the invention, the management system comprises a plurality of application objects each corresponding to an application available on a data communication network and each specifying a network connection point for the corresponding application. The application objects may be stored in a database accessible to the system. The system also comprises a plurality of subscriber objects each corresponding to a subscriber having a connection to the data communication network, each subscriber object specifying a network connection point for the corresponding subscriber. The subscriber objects may also be stored in the database. The system has a user interface which permits a user to create a subscription object associating one of the subscriber objects and one of the application objects. The system includes a network manager which creates in the data communication network a communication channel for each subscription object. The communication channel connects the network connection point for the subscriber of the subscription object and the network connection point for the application of the subscription object. In the case of an ATM network the communication channel is a virtual channel connection ("VCC"). In the case of a frame relay network the communication channel may be a frame relay path ("FRP").

The operator who creates the subscription object does not need to deal with low level information such as physical port numbers. Thus the invention ameliorates some of the disadvantages of prior art systems which are identified above. The capacity and other quality of service parameters for the virtual channel connection are preferably included in the application object for each application so that the system automatically creates an appropriate communication channel for each subscription.

Preferred embodiments of the system track statistics for each communication channel used in the delivery of a subscribed service to a subscriber. The statistics are associated with subscriptions. The statistics may be used to bill the subscriber for the service even if several different communication channels are used to provide the service. The management system preferably includes a statistics collector. The statistics collector collects statistics regarding those communication channels of the data communication network which correspond to each subscription. The management system comprises means for selecting and aggregating statistics for all of one or more communication channels used in the provision of a service according to a subscription over a selected period.

The invention also provides a method for managing the provision of services to users of a data communications network. The method comprising, in a computer system: storing in a database accessible to the computer system subscriber information identifying a plurality of subscribers and application information identifying one or more applications available to the subscriber; receiving user input identifying one subscriber and one application to be associated as a subscription; retrieving from the database a subscriber network connection point from the subscriber information for the one subscriber and an application network connection point from the application information for the one application; and, creating a virtual channel connection in the data communications network extending between the subscriber network connection point and the application network connection point. The virtual channel connection is created automatically between the correct endpoints without the requirement for an operator to manually specify points of network connection for the user or the application. The method of the invention accordingly provides a simplified procedure for providing services to subscribers on a data communications network. The following specification and claims point out other aspects and benefits of the invention.

BRIEF DESCRIPTION OF DRAWINGS

In drawings which illustrate non-limiting embodiments of the invention,

FIG. 6 is a schematic view of a system for client-side load balancing according to the invention; and.

DESCRIPTION

Figure 1:
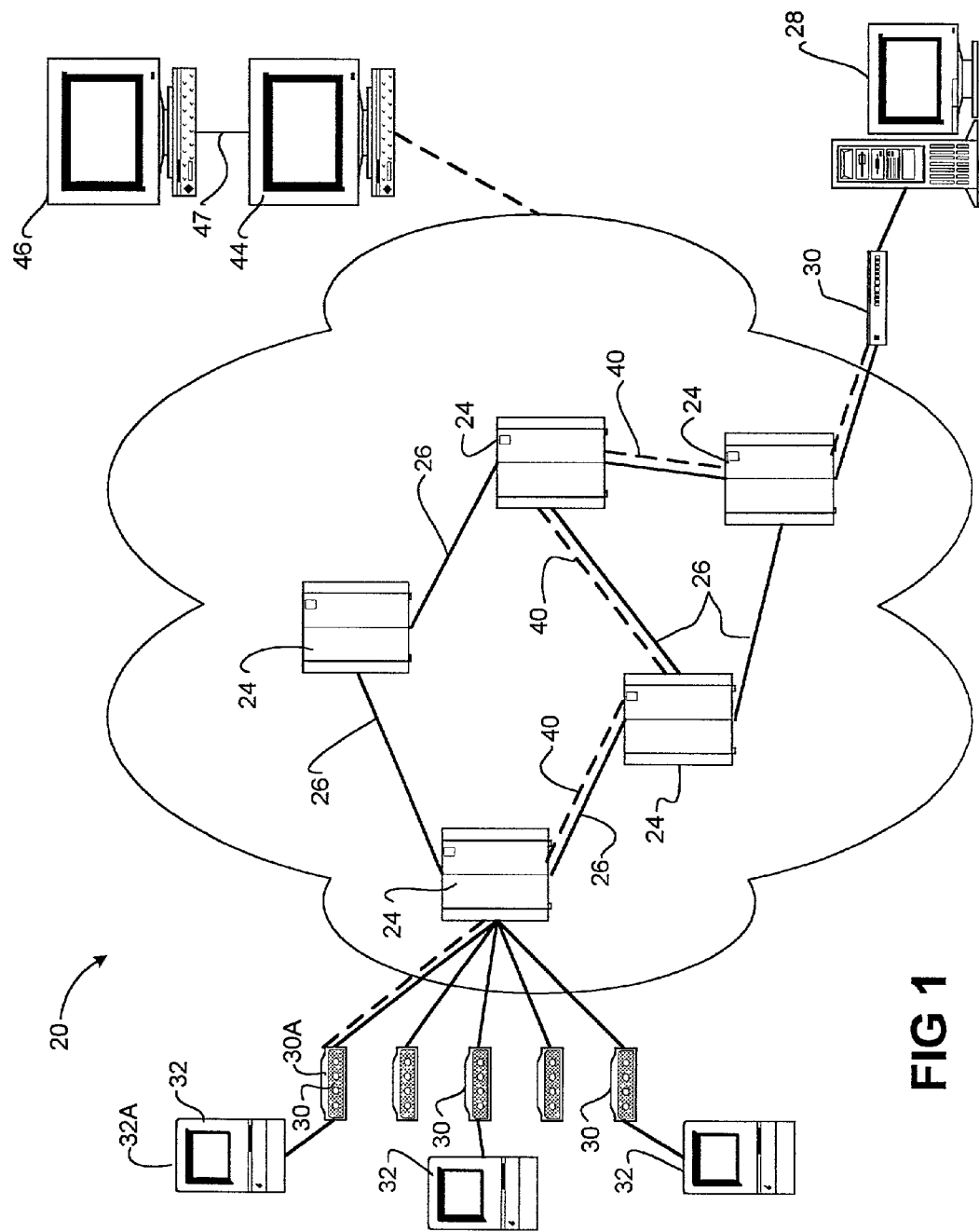
FIG. 1 is a schematic view of a data communication network comprising a service subscription manager according to the invention.

FIG. 1 is a schematic view of a network 20. For the purpose of illustration, network 20 is an ATM network. Network 20 could be any other suitable type of network in which communication channels can be set up between different points on the network.

Network 20 comprises a number of Asynchronous Transfer Mode ("ATM") switches 24 connected by communication lines 26, each capable of carrying digital information. One or more service providers provide servers 28 connected to network 20 by way of suitable access devices 30. A number of users or "subscribers" 32 are also connected to network 20 by way of suitable access devices 30. Access devices 30 for users 32 may be, for example, Digital Subscriber Line ("DSL") modems or wireless access devices.

Servers 28 can provide one or more services or "applications" to users 32. For example, a service might be the delivery of an audiovisual work (such as a movie) from server 28 to a particular user 32A through network 20. User 32A may be termed a subscriber who subscribes to the service provided from server 28. To enable such a service to be provided it is necessary to configure network 20 to provide a virtual channel connection ("VCC") (indicated by dashed line 40) from server 28 to the access device 30A for subscriber 32A. In many typical embodiments of the invention, VCC 40 is a Permanent Virtual Connection ("PVC").

VCC 40 must have sufficient bandwidth to provide the desired service. Where the service is delivery of an audiovisual work, VCC 40 must have sufficient bandwidth to carry the audiovisual work to subscriber 32A. If a service other than the delivery of an audiovisual work is provided then one or more VCCs each having an appropriate bandwidth and providing an appropriate level of Quality of Service ("QoS") will need to be set up so that the service can be delivered to subscriber 32A.

VCC 40 is created by configuring switches 24. A network manager 44, such as the MainStreetXpress™ 46020™ network manager, is attached to network 20. An operator of network manager 44 could configure switches 24 to provide VCC 40. To do this the operator would need to know in advance, or find out, the physical port at which access device 30A is connected to network 20 as well as the bandwidth and other QoS requirements for VCC 40. The operator can enter this information into network manager 44. Network manager 44 then sends commands to switches 24 to cause VCC 40 to be set up and connected. Looking up and manually entering such information can be tedious and can result in errors which either impair the service or prevent the service from operating at all. The errors may be hard to locate.

This invention provides a network management system 45 which includes a service subscription manager 46 which communicates with one or more network managers 44 through one or more communication links 47. Communication link 47 may be provided by network 20. Service subscription manager 46 contains one or more databases 50 which associates each subscriber 32 as identified by easily ascertainable information, such as name, address, telephone number or the like, with physical information needed to establish a VCC to that subscriber including port number on network 20.

In the preferred embodiment of the invention, service subscription manager 46 comprises two databases 50 and 51. This provides flexibility in implementation. Database 50 contains service level information and database 51 contains technical information regarding the resources of network 20. Database 50 may contain, for example, the following information about each subscriber 32: account name; password; contact information such as telephone number, e-mail address, postal address; personal information; administrative status; a list of services to which the subscriber has subscribed; and an association with technical network access information which is stored in database 51. Databases 50 and 51 are preferably implemented using object oriented database software.

Database 50 also associates services or "applications" provided by service providers, once again identified by easily ascertainable information such as a trade-mark, logo, provider name, or the like, with information describing the one or more VCCs needed to provide the service to any one of subscribers 32. Database 50 may contain, for example, the following information for each application: application provider; name; logo; e-mail contact for trouble reports; e-mail contact for service enquiries; a set of subscribers to the application; and associations to technical information about the class of service used to provide the application, and network access (application delivery point(s)) which are stored in database 51.

A third database (not shown) is preferably provided to track the rights that various operators of service subscription manager 46 have. For example, some operators may have rights to modify existing subscriptions but not to create new subscriptions, and so on.

An operator of system 45 can cause the VCCs necessary to provide a service to a subscriber 32A to be set up by creating a subscription in service subscription manager 46. A subscription associates a subscriber 32A with a service, for example a service provided from server 28. Particulars of the subscription are then stored in databases 50 and 51.

Figure 2:
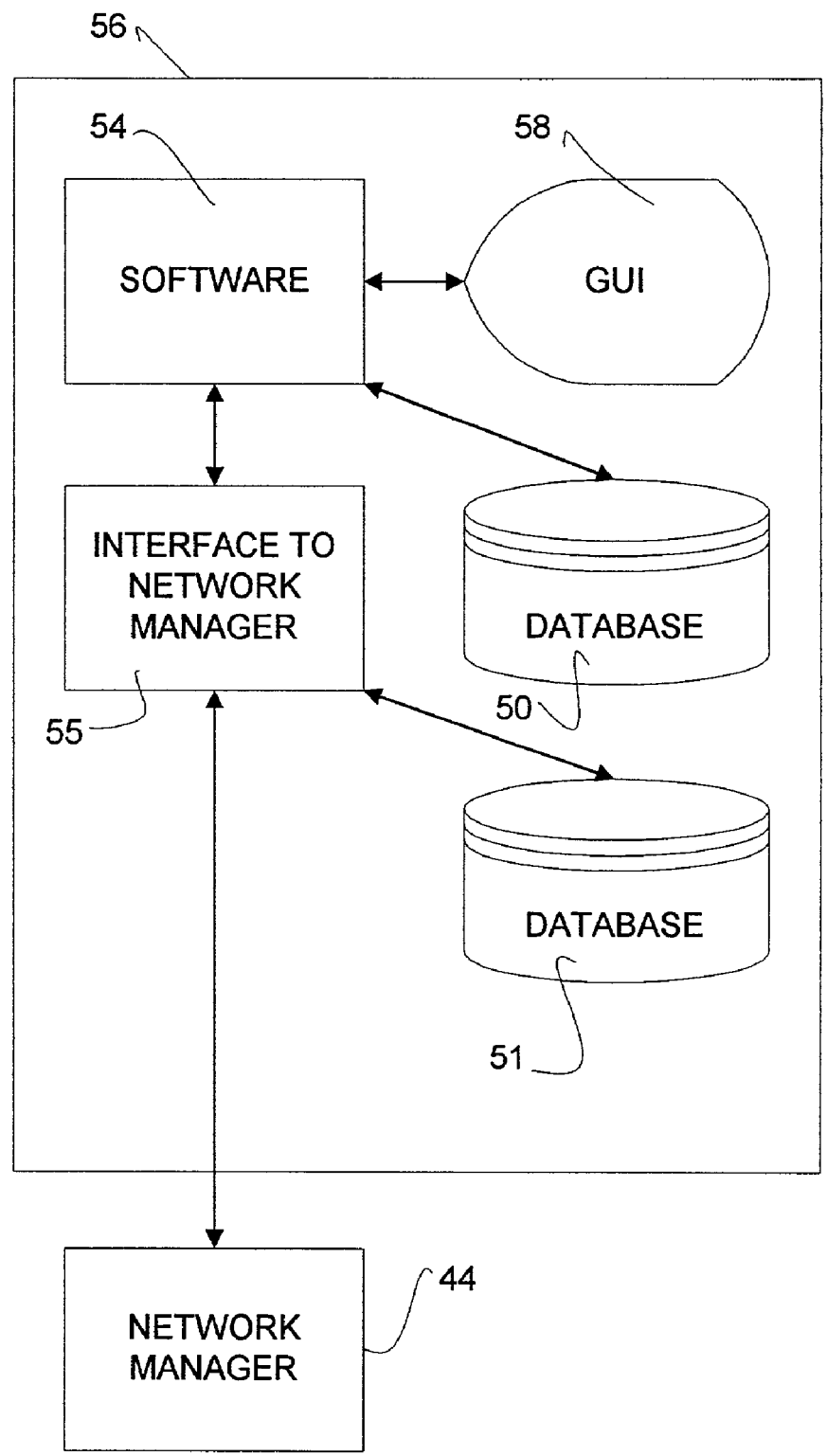
FIG. 2 is a schematic representation of a service subscription manager according to the invention.

As shown in FIG. 2, service subscription manager 46 preferably comprises software 54 running on a suitable network-connected computer 56. Software 54 has access to read and write to databases 50, 51 and an interface 55 to network manager 44. Service subscription manager 46 also has a user interface, which is preferably but is not necessarily a graphical user interface ("GUI") 58. The interface, for example GUI 58, may be provided on computer 56 or on a separate computer connected to computer 56. When an operator creates a new subscription (which associates a service and a subscriber), software 54 generates one or more messages which are sent to network manager 44 via interface 55. The messages cause network manager 44 to set up the VCC(s) required by the new service. The messages include information from databases 50 and 51 specifying the attributes of the VCC(s) required by the new service.

Figure 3:
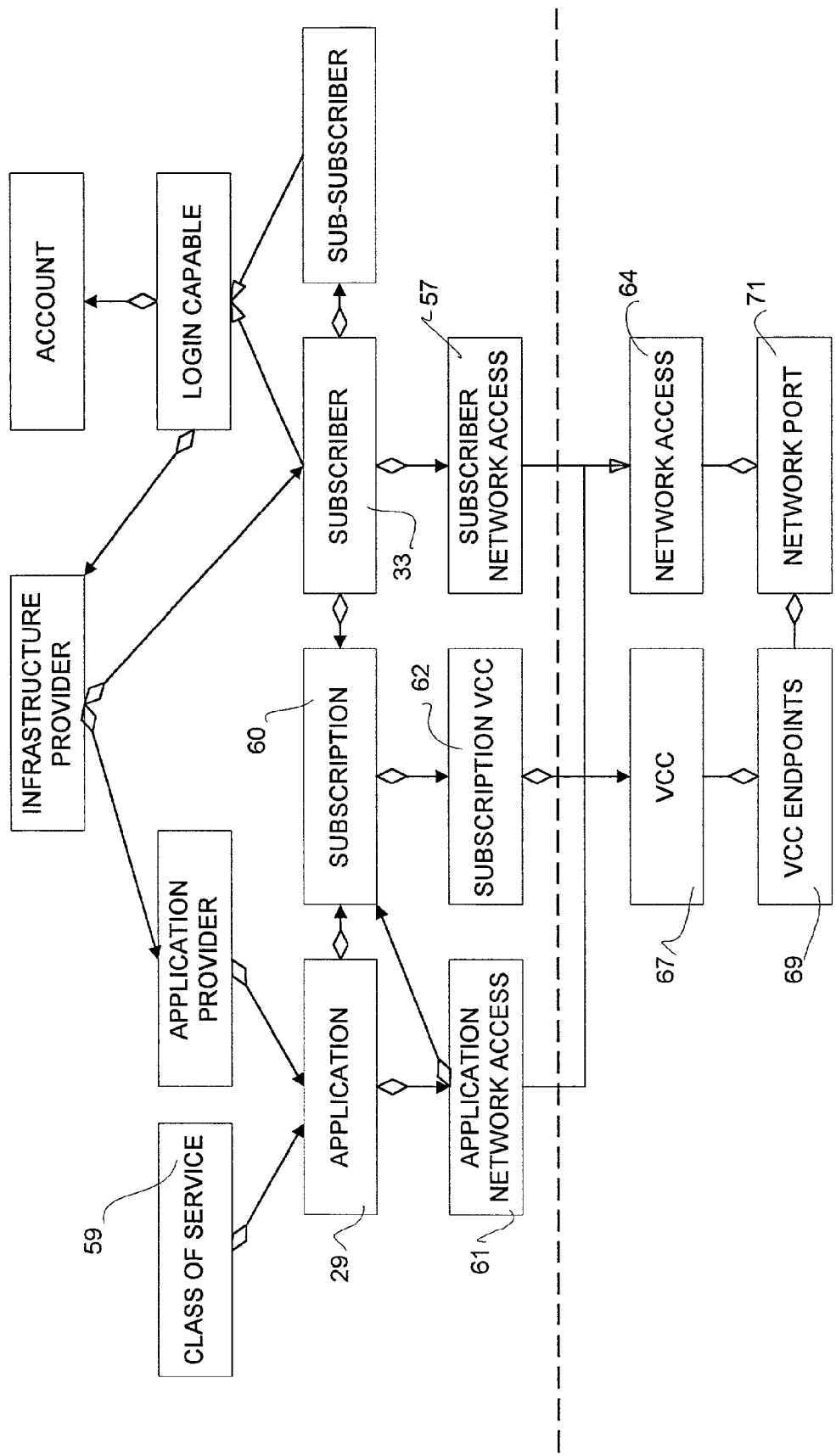
FIG. 3 is a representation of the relationships between some of the main objects in object oriented software embodying the invention.

It is convenient to describe software 54 using object oriented software engineering terminology. Object oriented software comprises a number of interacting software objects. Each object represents a real or abstract entity. Each object includes data which is encapsulated in the object and software which can manipulate the data and control how the object interacts with other objects. FIG. 3 illustrates relationships between objects of an embodiment of software 54 in Universal Modelling Language ("UML").

Using such an object oriented description permits a subscriber 32 to be represented in software 54 as a subscriber object 33. Each subscriber object 33 contains or is linked to data which includes the name of the subscriber and the physical port through which the subscriber accesses network 20 (subscriber network access object 57). A service, such as the service provided by server 28 may be represented as a service object 29. The service object 29 contains, or is linked to, data which includes the name of the service, the level of QoS required by the service (class of service object 59), and the physical port (or ports) through which server 28 accesses network 20 (application network access object 61).

A subscription object 60 links a service object 29 and a subscriber object 33. The subscription object may contain or link to data, such as statistics on the use of the service which may be used for billing purposes.

The subscription VCC object 62 links subscription object 60 to VCC object 67 which represents the actual VCC 40 which will be used by the subscription. VCC object 67 defines a virtual connection between endpoints specified by VCC endpoints object 69. The VCC endpoints are determined by the network port object 71 associated with the network access 64 which is associated with each of the application network access 61 and the subscriber network access 57. The application and subscriber network access objects each inherit the attributes of network access object 64.

A subscription object 60, together with the service object 29 and the subscriber object 33 which it associates, contain all of the information necessary to set up VCC 40 including the port at which subscriber 32A connects to network 20 (from the subscriber network access object 57), the port at which server 28 connects to network 20 (from the application network access object 61), and the bandwidth and any other QoS requirements on VCC 40 (from the class of service object 59). Preferably, various classes of service are predefined. Each class of service specifies QoS parameters such as: service category, peak information rate in each direction, and sustained information rate in each direction. Each application can have its own asymmetrical class of service definition. The various objects used by software 54 may be stored in databases 50 and 51.

Service subscription manager 46 generates commands which cause network manager 44 to create VCCs 40. The commands include the information needed by network manager 44 to set up VCCs 40. Network manager 44 subsequently causes switches 24 to configure themselves to provide VCCs 40.

Figure 1A:
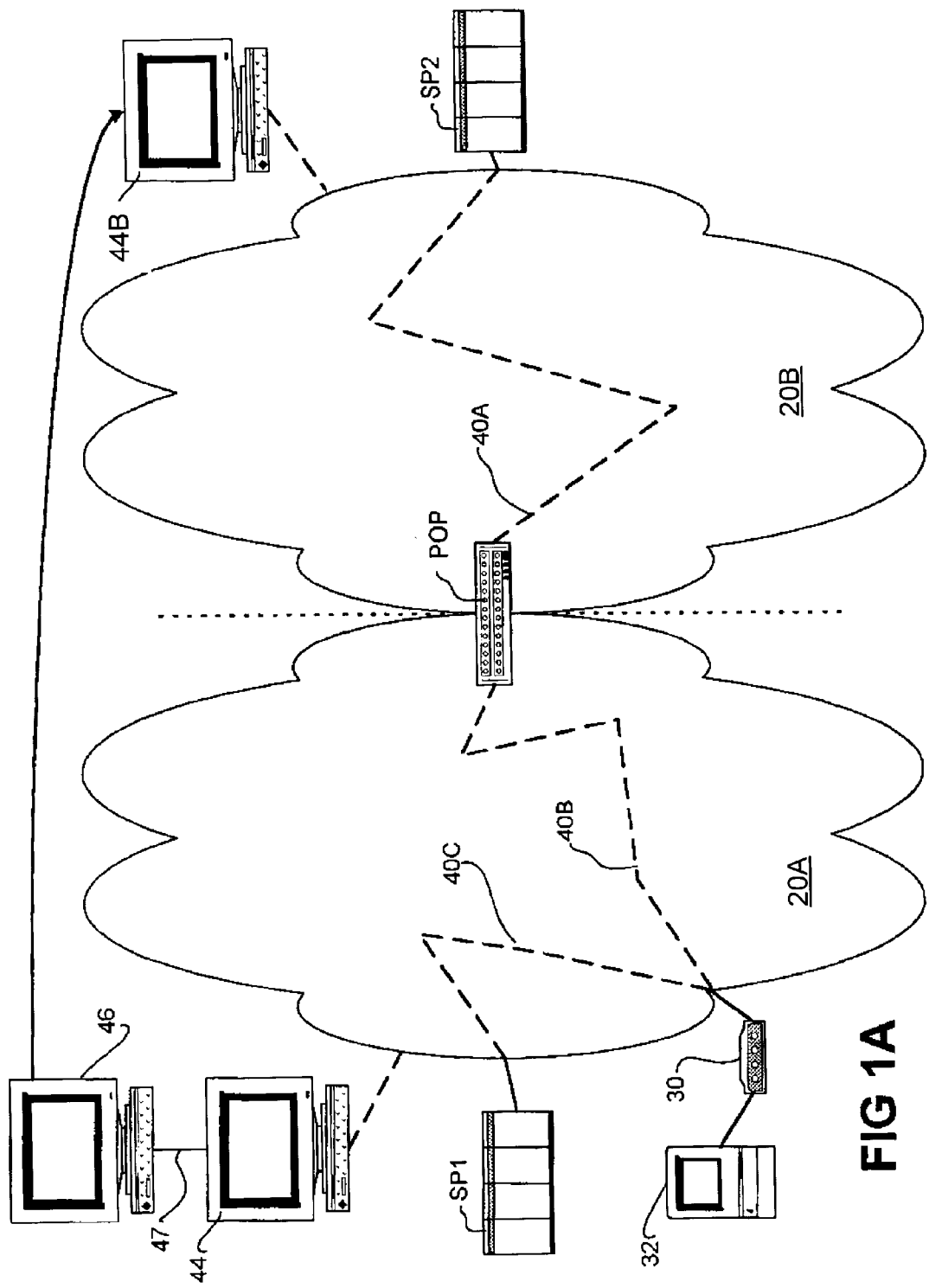
FIG. 1A is a schematic view of a service subscription manager according to the invention being used in the management of subscriptions on a two part data communication network.

In some cases network manager 44 will not have control over all of network 20. FIG. 1A shows a situation where a network has two portions 20A and 20B connected at a point of presence POP. Network manager 44 only has direct control over portion 20A of the network. A separate network manager 44B which is not under the direct control of service subscription manager 46 manages portion 20B of the network. This situation might exist, for example, where different infrastructure providers maintain portions 20A and 20B. If a service provider SP1 and a subscriber 32 are both in portion 20A of the network then network manager 44 can create the necessary communication channel 40C directly. On the other had, if the service provider is in a different portion of the network from subscriber 32 then communication channels must be set up in bother of portions 20A and 20B. Service subscription manager 46 directly commands network manager 44 to create a communication channel 40B between subscriber 32 and point of presence POP. Service subscription manager 46 also generates a work order message asking that a communication channel 40A from point of presence POP to service provider SP2 be created. The work order messages may be sent by calling a remote script from software 54.

Service subscription manager 46 preferably includes a facility to enable or disable subscriptions that are set up in service subscription manager 46 without deleting the subscriptions. This facility might be used, for example, to temporarily suspend a subscription for which a subscriber's payment is overdue. This facility may be provided by including an "enable" attribute in the subscription object 60. The enable attribute can be set to one state to enable the subscription in question and set to another state to disable the subscription in question. When an operator commands software 54 to disable a service, software 54 sets the "enable" attribute for the subscription in question to its disabled state and sends a command to network controller 44 instructing network controller 44 to take down the VCCs for the service in question. Preferably, service subscription manager 46 also permits subscribers to turn on or off subscriptions that have been previously set up.

In order to conserve network resources, VCCs 40 are preferably connected only when a service is in use. For example, service subscription manager 46 may cause network manager 44 to connect the VCCs 40 for a particular service when a subscriber 32 who has a valid subscription logs onto network 20 and is assigned a network access and enables the subscription, or when a subscription is added for a subscriber who already has a network access or when a disabled subscription for a subscriber who already has a network access is enabled. The VCCs may be taken down when a subscriber 32 who has a valid and enabled subscription logs out from network 20 (and thereby removes their network access) or when an enabled subscription is cancelled or becomes disabled.

Preferably, service subscription manager causes the VCCs for a subscription to be enabled only when the following conditions all hold:
1. the subscriber is "enabled" (a subscriber might not be enabled if the subscriber were a new subscriber, not yet completely entered into the system or if the subscriber had not paid its bills);
2. the subscription is enabled;
3. the application (service) is enabled;

4. the subscriber's network access is enabled and operational;
5. the service provider's network access is enabled and operational; and,
6. the subscriber has not turned the subscription off.

Network manager 44 includes a statistics collector, as is known in the art. The statistics collector may, for example, be the statistics collector function of a Newbridge™ 46020 network manager. The statistics collector collects statistics regarding the usage of each VCC provided on network 20 including the volume of data transferred over the VCC and the length of time that each VCC is connected. The raw information provided by the statistics collector is not directly useful for billing for services because several different VCCs may be used to provide the same service over time.

Service subscription manager 46 periodically receives statistics from network manager 44 and collects together the statistics that relate to VCCs used by each subscription. Service subscription manager 46 does this by identifying the VCCs used by each subscription from the information in databases 50 and 51 and by searching the statistics provided by network manager 44 for statistics on those VCCs. Service subscription manager 46 then produces concise records which summarize the aggregate usage of network resources by each subscription over a selected period. The records may be used by a billing system to bill subscribers 32 for usage of network 20.

Preferably network 20 is partitioned so that the network access points for subscribers 32 and the application network access points for server(s) 28 and all of the PVCs between them are placed into one or more Virtual Switched Networks ("VSNs").

Figure 4:
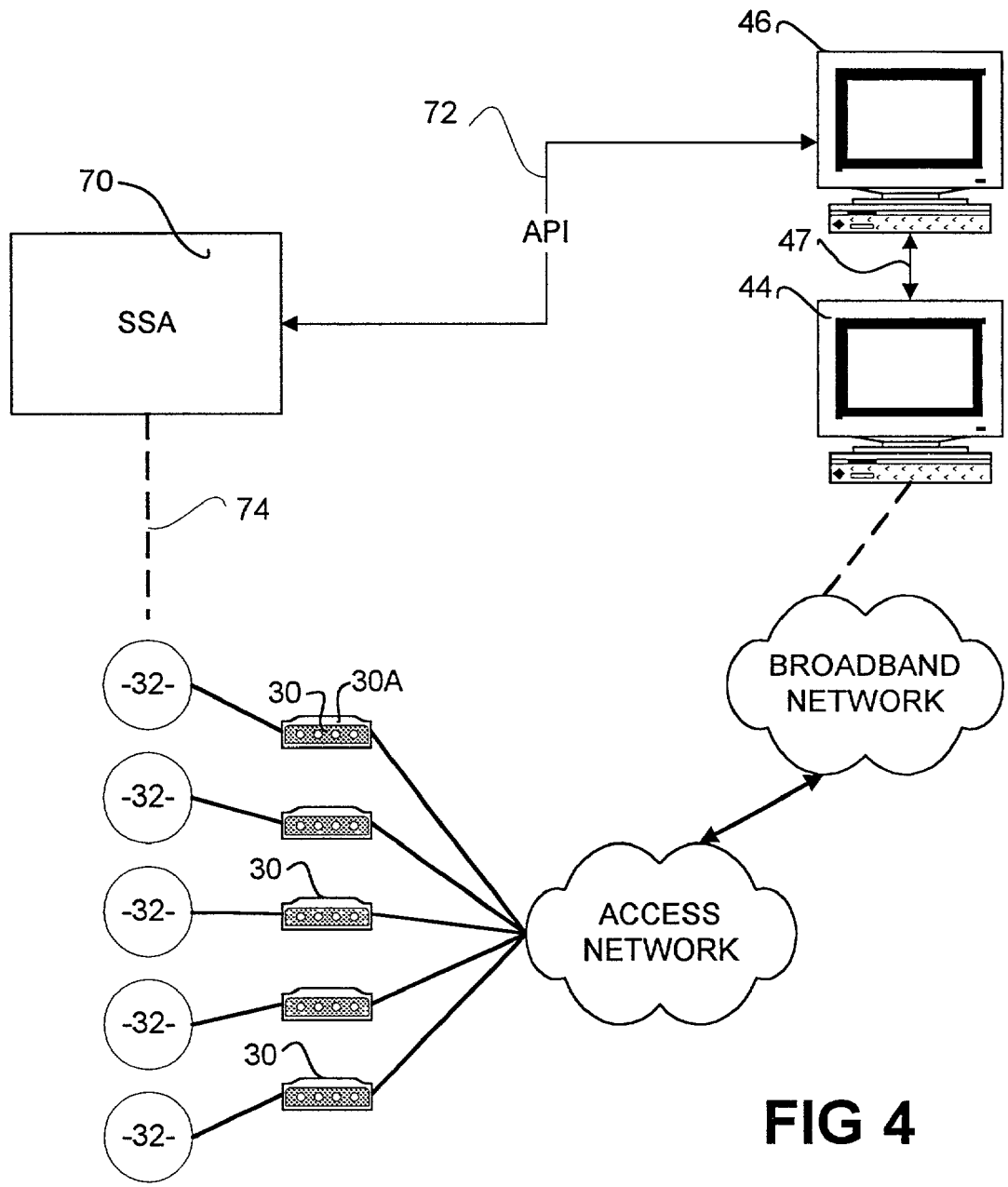
FIG. 4 is a schematic view illustrating the connection of a service selection agent to the a network equipped with a subscriber management system.

It is useful to provide subscribers 32 with a mechanism to select and control their subscriptions. As shown in FIG. 4, The invention provides a Service Selection Agent ("SSA") 70 which interfaces with service subscription manager 46 by way of a suitable Application Programming Interface ("API") 72. API 72 is preferably a CORBA based API. SSA 70 may be maintained and operated by a carrier who may be a different entity than the entity which provides and operates network 20, network manager 44 and service subscription manager 46.

Subscribers 32 can communicate with SSA 70 by way of a web based interface indicated by line 74. Subscribers can use SSA 70 to dynamically switch between different services. For example, a subscriber 32 who had subscriptions to both a work-at-home session and a general high-speed Internet access service could use SSA 70 to dynamically switch between these two services. When a subscriber uses SSA 70 to enable a service, service subscription manager 46 commands network manager 44 to connect the VCC 40 required by that service. SSA 70 preferably also permits subscribers to sign up for new subscriptions for themselves.

Figure 5:
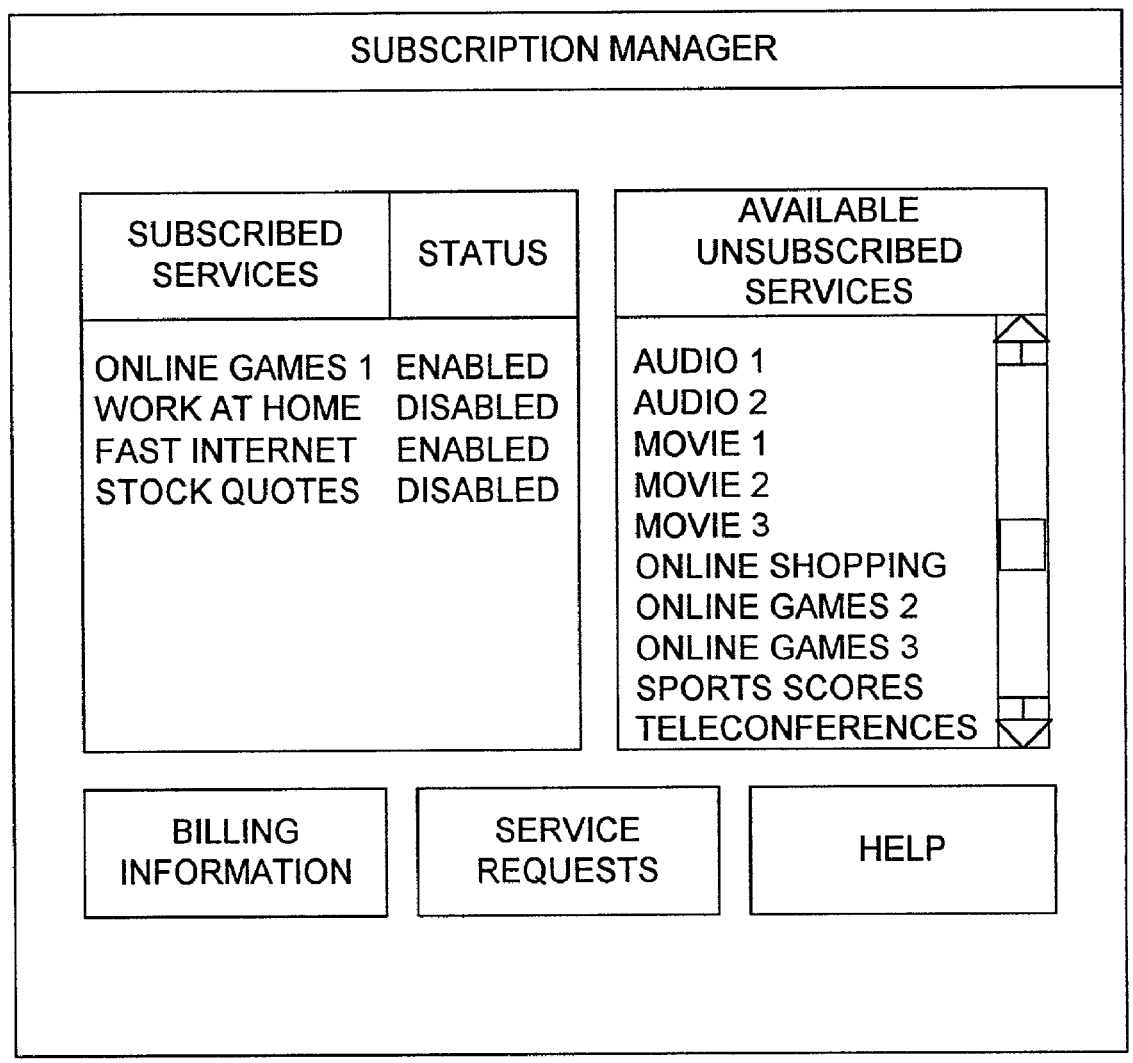
FIG. 5 is a depiction of a graphical user interface of a type which may be presented to a subscriber by a service selection agent according to the invention.

SSA 70 obtains information about the services subscribed to by each subscriber through API 72. Links to each service may be displayed on the web page of SSA 70. FIG. 5 shows an example web page which could be provided by a suitable server 71 associated with SSA 70 to enable a subscriber 32 to inter alia select between subscribed services, enable or disable subscribed services, or to obtain information about the status of the subscriber's subscriptions. The web page of FIG. 5 would be made available to a subscriber only after the subscriber had entered an account name and a password.

SSA 70 will typically have a plurality of servers 71 so that many subscribers can be serviced at the same time. SSA 70 could, for example, comprise an application running on a Netscape™ Enterprise Server. Servers 71 may invoke commands on service subscription manager 46 by way of API 72 to authenticate the identity of a subscriber 32 before allowing the subscriber 32 access to information about subscriptions via SSA 70. Servers 71 may obtain information about subscriptions of a subscriber 32 by causing service subscription manager 46 to interrogate database 50 and forward the requested information via API 72.

Figure 6:
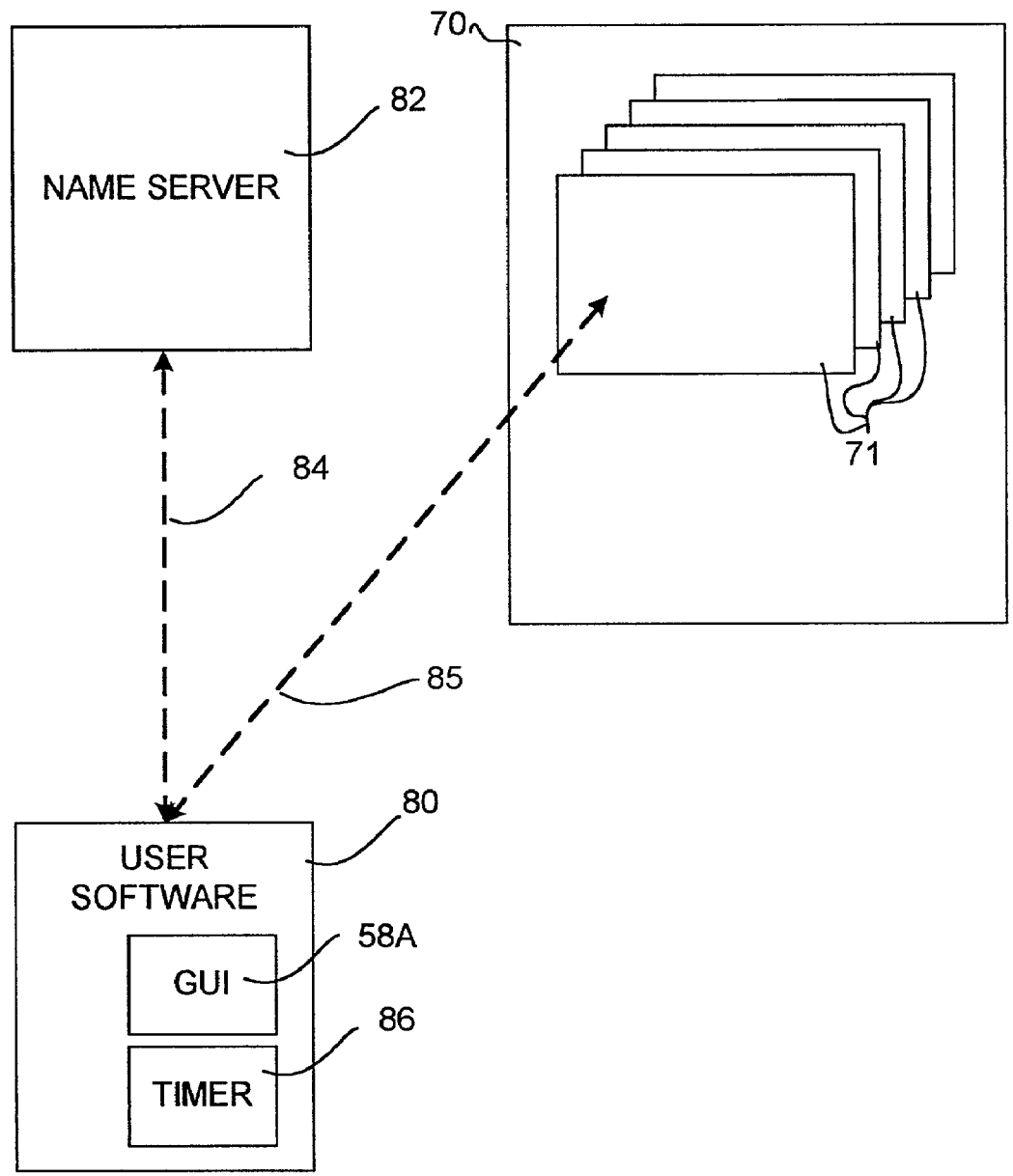
Figure 6A:
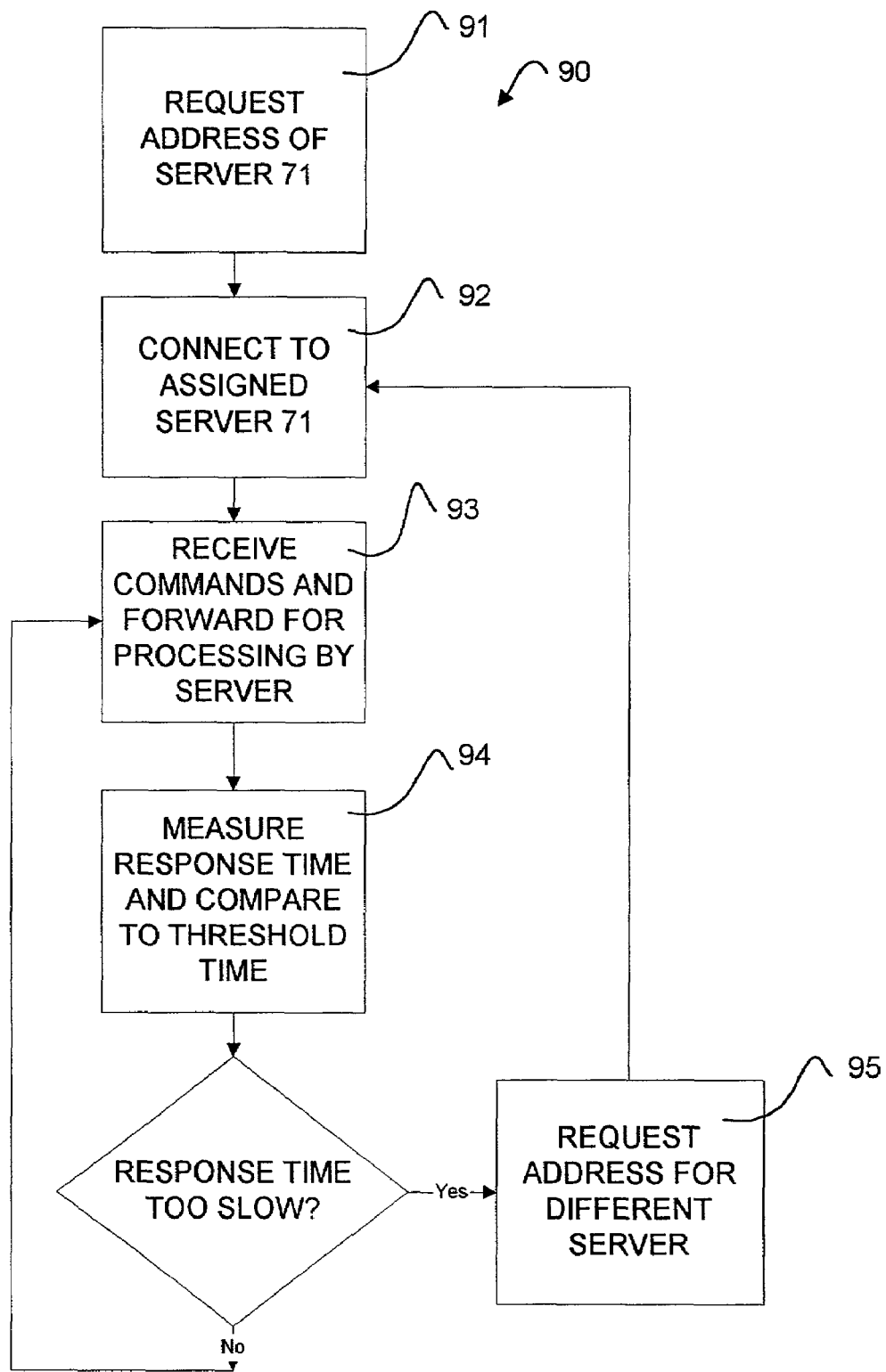
FIG. 6A is a flow chart illustrating a method of client-side load-balancing.

One problem that can occur is that one or more of servers 71 may be over utilized. Subscribers connected to the over utilized servers 71 will experience slow response times. At the same time, other ones of servers 71 may be idle or only lightly utilized. Preferred embodiments of the invention provide client-side load balancing to more evenly distribute subscribers among servers 71. FIG. 6 illustrates apparatus for providing client-side load balancing in the invention. FIG. 6A illustrates a method 90 of client-side load balancing according to the invention.

As shown in FIG. 6, a user runs user software 80 to connect to one of service selection servers 71 of SSA 70. User software 80 may be, for example, a JAVA applet running on a subscriber's network connected computer. Software 80 interrogates a name server 82 which returns an address for one of service selection servers 71 as indicated by line 84 (step 91). Software 80 then connects to the assigned service selection server 71 as indicated by line 85 (step 92). Name server 82 is designed to assign service selection servers 71 to subscribers in such a fashion that a roughly equal number of subscribers are serviced by each service selection server 71. Suitable hardware and software for implementing name server 82 is known to those skilled in the art and is available off the shelf from various parties and will therefore not be described herein.

The foregoing scheme does not take into account the fact that some subscribers may place much higher demands on a service selection server 71 than other subscribers. The invention provides a timer 86 in user software 80. A user uses GUI 58A to enter commands for processing at service selection server 71, the commands are forwarded to service selection server 71 by the user's computer under the control of software 80 (step 93). Timer 86 monitors the time taken by the service selection server 71, to which the software 80 is connected, to respond to certain commands (step 94). If the response time becomes excessive (i.e. the response time exceeds a threshold time) then user software 80 sends a request to name server 82 that it be connected to a different service selection server 71 (step 95). Currently available name servers 82 support requests from client software to be connected to a different server. The threshold time may be a preset value which is provided in user software 80 or may be a value which is computed from previous response times experienced by software 80. Name server 82 returns the address of a different service selection server 71 for the user software 80 to connect to. Name server 82 may select the different service selection server 71 randomly from other available service selection servers 71. User software 80 then connects to the new service selection server 71. The result is that the loads on service selection servers 71 tend to become balanced because user software 80 which is experiencing unacceptable response times from a service selection server 71 will switch to a different service selection server 71.

Figure 7:
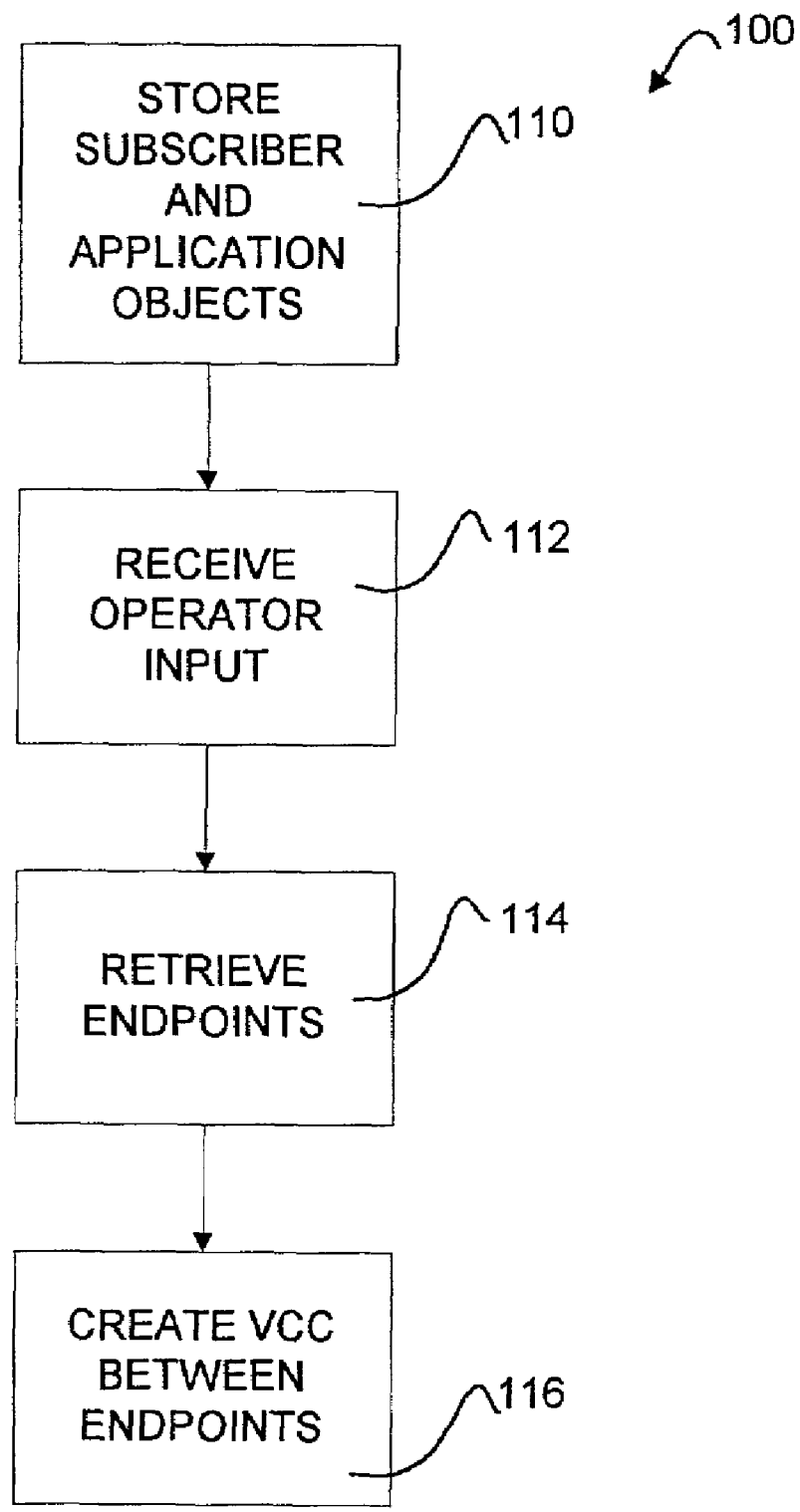
FIG. 7 is a flow chart illustrating a method according to the invention.

While the invention has been described above with reference to a network subscription management system, the invention also provides a method 100 for managing the provision of services to users of a data communications network. The method is performed in a computer system. As shown in FIG. 7, the method begins with storing in database 50 accessible to computer system 56 subscriber information identifying a plurality of subscribers and application information identifying one or more applications available to the subscriber (indicated by 110). The method continues with receiving user input identifying one subscriber and one application to be associated as a subscription (indicated by 112). When the subscription has been made, the method retrieves from database 50 a subscriber network connection point from the subscriber information for the one subscriber and an application network connection point from the application information for the one application (indicated by 114). The method finishes by automatically creating a virtual channel connection (VCC 40) in the data communications network 20. The VCC extends between the subscriber network connection point and the application network connection point.

As will be apparent to those skilled in the art in the light of the foregoing disclosure, many alterations and modifications are possible in the practice of this invention without departing from the spirit or scope thereof. For example, the invention may be used in non-ATM networks. Various specific types of hardware and software may be used in the implementation of the invention. The method for balancing loads on service selection servers 71, which is described above, may be used to balance loads on other kind of web servers. Accordingly, the scope of the invention is to be construed in accordance with the substance defined by the following claims.

What is claimed is:

1. A management system for a data communication network, the management system comprising:
    a) a plurality of application objects, each application object having a one to one correspondence with an application available on a data communication network and each application object specifying a network connection point for the corresponding application;
    b) a plurality of subscriber objects each corresponding to a subscriber having a connection to the data communication network, each subscriber object specifying a network connection point for the corresponding subscriber;
    c) a user interface permitting a user to create a subscription object associating one of the subscriber objects and one of the application objects; and,
    d) a network manager for creating, in the data communication network, at least one communication channel for each subscription object, the communication channel connecting the network connection point for the subscriber of the subscription object and the network connection point for the application of the subscription object.

2. The management system of claim 1 wherein the application objects each contain information specifying a quality of service level for the communication channel and the network manager creates the communication channel having the specified quality of service level.

3. The management system of claim 2 wherein the quality of service level includes a peak bit rate for communications over the communication channel in a direction from the subscriber to the application and a different peak bit rate for communications over the communication channel in a direction from the application to the subscriber.

4. The management system of claim 1 wherein each subscription has a status of enabled or disabled by an operator and wherein the network manager causes the data communication network to disconnect the communication channel for a subscription whenever the status of the subscription is disabled.

5. The management system of claim 4 comprising a service subscription agent, the service subscription agent comprising a user interface accessible to a subscriber, the user interface providing a control whereby the subscriber may change the status of any of one or more subscriptions of that subscriber from enabled to disabled or from disabled to enabled.

6. The management system of claim 1 comprising a statistics collector, the statistics collector collecting statistics regarding communication channels of the data communications network, the management system comprising means for selecting and aggregating statistics for all of one or more communications channels used in the provision of a service of a subscription over a selected period.

7. The management system of claim 1 wherein the data communications network comprises an ATM network and the communication channels are virtual channel connections.

8. The management system of claim 1 wherein no virtual channel connection is associated more than one subscription.

9. The management system of claim 5 wherein the network comprises a name server and the service selection agent comprises a plurality of service selection servers and a plurality of user software capable of connecting to the service selection servers, wherein the user software comprises a timer connected to measure a response time taken for a connected service selection server to respond to a command and the user software is adapted to request from the name server a connection to a different service selection server if the measured response time exceeds a threshold time.

10. A method for managing the provision of services to users of a data communications network, the method comprising, in a computer system:
    a) storing in a database accessible to the computer system subscriber information identifying a plurality of subscribers and application information identifying one or more applications available to the subscriber, the application information comprising one or more application objects, each application object having a one to one correspondence with a particular one of the one or more applications and each application object specifying a network connection point for the particular application;
    b) receiving user input identifying a selected subscriber and a selected application to be associated as a subscription;
    c) retrieving, from the database, a selected subscriber network connection point from the subscriber information for the selected subscriber and a selected application network connection point from the application object corresponding to the selected application; and,
    d) creating a communications channel in the data communications network extending between the selected subscriber network connection point and the selected application network connection point.

11. The method of claim 10 wherein the data communications network comprises an ATM network and the communications channel comprises a virtual circuit connection.

12. The method of claim 11 wherein the application object corresponding to the selected application comprises information specifying a quality of service level for the virtual circuit connection and creating the communication channel comprises creating a virtual circuit connection having the specified quality of service level.

13. The method of claim 12 wherein the quality of service level includes a peak bit rate for communications over the communication channel in a direction from the selected subscriber to the selected application and a different peak bit rate for communications over the communication channel in a direction from the selected application to the selected subscriber.

14. The method of claim 11 comprising disconnecting the communication channel for a subscription whenever:
    (a) the selected subscriber is not enabled;

(b) the subscription is not enabled;

(c) the selected application is not enabled;

(d) a network access for the selected subscriber is not enabled and operational; or (e) a network access for the selected application is not enabled.

15. The method of claim 10 comprising providing a service selection agent comprising a user interface accessible to a subscriber, the user interface providing a control whereby the subscriber may change the status of one or more subscriptions of that subscriber from enabled to disabled or from disabled to enabled.

16. The method of claim 15 wherein the service selection agent comprises a plurality of service selection servers and the method includes connecting user software to a service selection server; measuring a response time of the service selection server; and, connecting the user software to a different one of the service selection servers if the measured response time exceeds a threshold time.

17. The method of claim 10 comprising collecting statistics regarding communication channels of the data communications network and periodically selecting and aggregating statistics for all of one or more communications channels associated with each subscription.

18. The method of claim 17 wherein the data communications network comprises an ATM network and the communication channels are virtual channel connections.

* * * * *